(12) United States Patent
Young et al.

(10) Patent No.: US 9,453,599 B2
(45) Date of Patent: Sep. 27, 2016

(54) BI-CHANNEL COOLANT TUBE HAVING CROSSOVER CHANNELS TO ALLOW COOLANT INTERACTION

(71) Applicant: Ford Global Technologies, LLC, Dearborn, MI (US)

(72) Inventors: Calvin Young, Troy, MI (US); Yi Zhang, Ann Arbor, MI (US); LaMar Stewart, Ypsilanti, MI (US); Yafang Miao, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 159 days.

(21) Appl. No.: 13/923,973

(22) Filed: Jun. 21, 2013

(65) Prior Publication Data

US 2014/0373960 A1 Dec. 25, 2014

(51) Int. Cl.
*F16L 9/18* (2006.01)
*F15D 1/04* (2006.01)
*F16L 9/19* (2006.01)
*F16L 9/00* (2006.01)

(52) U.S. Cl.
CPC . *F16L 9/19* (2013.01); *F16L 9/006* (2013.01)

(58) Field of Classification Search
USPC .................. 138/115, 116; 165/165, 174, 179
See application file for complete search history.

(56) References Cited

U.S. PATENT DOCUMENTS

| | | | |
|---|---|---|---|
| 3,625,258 A * | 12/1971 | Phelps ........................... | 138/115 |
| 4,715,432 A * | 12/1987 | Paikert .................. | F28D 1/0391 138/40 |
| 5,092,366 A * | 3/1992 | Sakamoto ........................ | 138/37 |
| 5,099,879 A * | 3/1992 | Baird .......................... | 137/561 A |
| 5,186,250 A * | 2/1993 | Ouchi ................... | F28D 1/0316 165/152 |
| 5,865,564 A * | 2/1999 | Miller et al. ................... | 405/115 |
| 5,937,908 A * | 8/1999 | Inoshiri et al. ................ | 138/39 |
| 6,209,202 B1 * | 4/2001 | Rhodes ................. | B21C 37/151 165/177 |
| 6,325,141 B2 * | 12/2001 | Yamauchi ...................... | 165/177 |
| 6,481,928 B1 * | 11/2002 | Doolaege ...................... | 405/115 |
| 6,622,785 B2 * | 9/2003 | Haegele ................ | F28D 1/0391 138/118 |
| 7,422,035 B2 * | 9/2008 | Wu .............................. | 138/118 |
| 2004/0123914 A1 * | 7/2004 | Chih ............................ | 138/115 |
| 2005/0006082 A1 * | 1/2005 | Brost .................... | F28D 1/0391 165/177 |
| 2005/0085363 A1 * | 4/2005 | Helms ....................... | F16L 9/19 493/51 |
| 2007/0137717 A1 * | 6/2007 | Vakili ............................ | 138/39 |
| 2011/0094615 A1 * | 4/2011 | Butler ........................... | 138/157 |

* cited by examiner

*Primary Examiner* — Paul R Durand
*Assistant Examiner* — Vishal Pancholi
(74) *Attorney, Agent, or Firm* — LeClairRyan

(57) ABSTRACT

A bi-channel tube for use in a heat exchanger is disclosed having a passageway or window formed in the common wall or divider separating the adjacent channels. This arrangement permits a controlled amount of interaction of the fluids flowing in the adjacent channels in the bi-channel tube. The bi-channel coolant tube includes a first fluid-carrying channel, a second fluid-carrying channel, a common wall or divider separating the first fluid-carrying channel from the second fluid-carrying channel, and at least one fluid-passing passageway or window formed in the common wall or divider. The fluid-passing passageway or window is preferably an elongated window that is formed along the long axis of the bi-channel coolant tube. The bi-channel coolant tube may be composed of a metal such as aluminum, including aluminum alloy, and steel, including stainless steel.

16 Claims, 6 Drawing Sheets

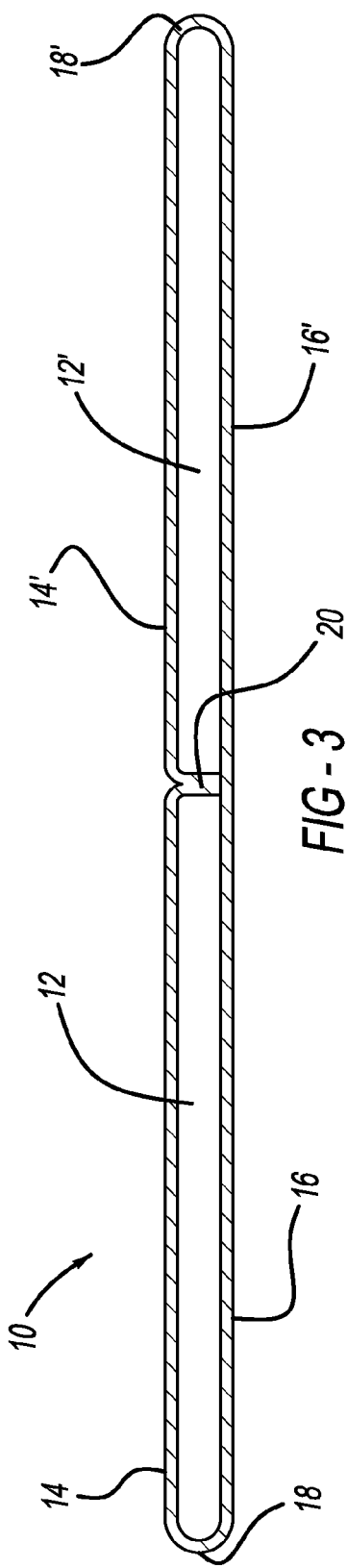
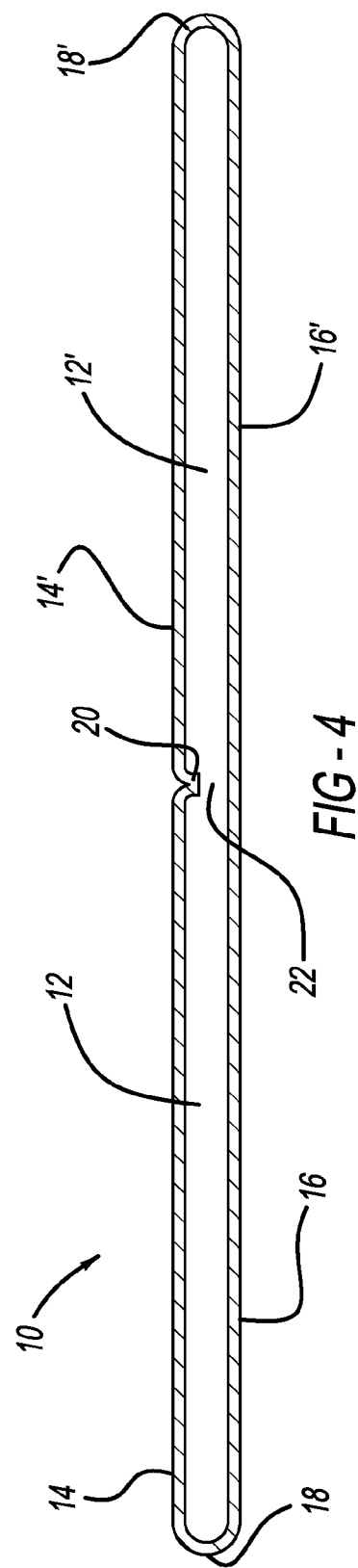

BI-CHANNEL COOLANT TUBE HAVING CROSSOVER CHANNELS TO ALLOW COOLANT INTERACTION

TECHNICAL FIELD

The disclosed inventive concept relates generally to coolant tubes used in vehicle heat exchangers. More particularly, the disclosed inventive concept relates to bi-channel coolant tubes used in heat exchangers that carry hot and cold coolant.

BACKGROUND OF THE INVENTION

It is known in automotive technology to provide vehicles with heat exchangers such as condensers, evaporators, heater cores and coolers. These heat exchangers ordinarily include alternating rows of tubes or plates with convoluted fins. Such heat exchangers are ordinarily made of a metal material such as aluminum or an aluminum alloy.

It is known in the art of heat exchanges, such as vehicle radiators, to include bi-channel tubes. In the bi-channel tube there is a solid common wall or divider provided to keep separate the coolant flowing in the two channels such that hot coolant travels in one channel and cold coolant travels in the adjacent channel. The divider adds structural integrity to the heat exchanger.

While providing a practical solution to many of the challenges faced in vehicle cooling the coolant flow in bi-channel tubes used in heat exchangers today has potential to bias flow in one channel in the two-channel tube. Biased coolant flow happens when hot or cold coolant enters one of the two-channels first. This biased flow causes temperature differentials in the tube when different temperature coolant enters each of the two-channels at different times. The result is thermal stress within the tube. Over time this thermal stress leads to premature breakdown of the heat exchanger and may lead to uncontrolled breaks of coolant flow from one channel into another, thus compromising the overall effectiveness of the heat exchanger and requiring expensive repair or replacement of the heat exchanger.

As in so many areas of vehicle technology there is always room for improvement related to the construction of heat exchangers in the automobile.

SUMMARY OF THE INVENTION

The disclosed inventive concept overcomes the problems associated with known heat exchangers by permitting a controlled amount of interaction of the fluids flowing in the adjacent channels in a bi-channel tube. This is generally achieved by providing one or more passageways or windows in the common wall or divider.

Particularly, the disclosed bi-channel coolant tube includes a first fluid-carrying channel, a second fluid-carrying channel, a common wall or divider separating the first fluid-carrying channel from the second fluid-carrying channel, and at least one fluid-passing passageway or window formed in the common wall or divider.

The fluid-passing passageway or window allows the coolant flowing in the two adjacent channels to interact within the bi-channel coolant tube in a controlled manner, thus reducing any existing temperature differential between the coolant in the two channels. This limited exchange of fluids thus reduces thermal stress and consequently reduces the likelihood that the heat exchanger will experience premature structural failure.

The fluid-passing passageway or window is preferably an elongated window that is formed along the long axis of the bi-channel coolant tube. While other configurations are possible, the bi-channel coolant tube of the disclosed inventive concept is substantially flat.

The bi-channel coolant tube of the disclosed inventive concept may be formed from a variety of metals as is known in the art. Such metals include, but are not limited to, aluminum, including aluminum alloy, and steel, including stainless steel.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein:

FIG. 3 is a sectional view of the bi-channel coolant tube taken along line 3-3 of FIG. 1;

FIG. 4 is a sectional view of the bi-channel coolant tube taken along line 4-4 of FIG. 1;

DETAILED DESCRIPTION OF THE PREFERRED EMBODIMENT

Figure 1:
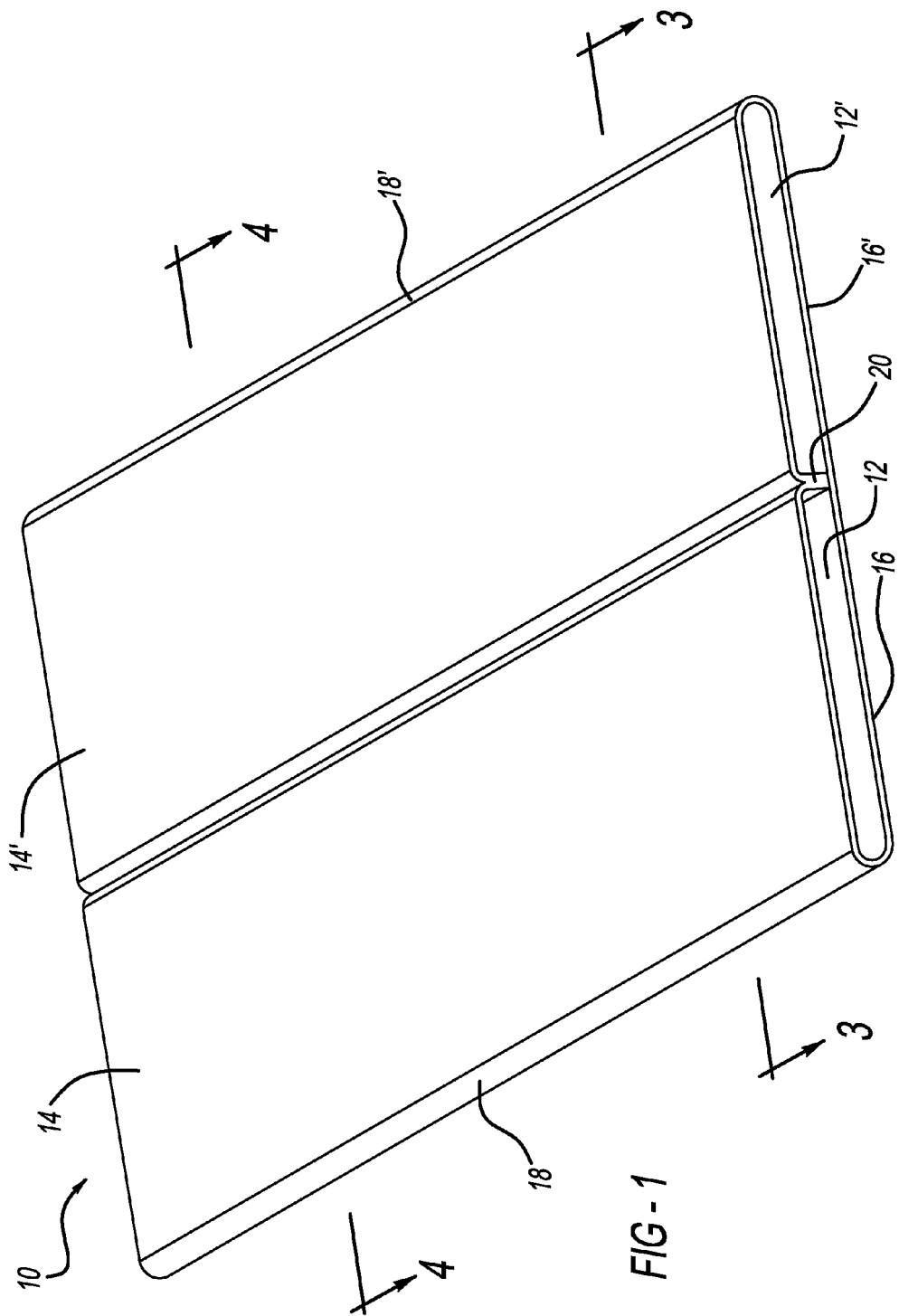
FIG. 1 illustrates a perspective view of a portion of a bi-channel coolant tube according to the disclosed inventive concept.

In the following figures, the same reference numerals will be used to refer to the same components. In the following description, various operating parameters and components are described for different constructed embodiments. These specific parameters and components are included as examples and are not meant to be limiting.

The bi-channel coolant tube of the disclosed inventive concept is shown in FIG. 1 and is generally illustrated as 10.

The bi-channel coolant tube 10 includes a first fluid-carrying channel 12 and a second fluid-carrying channel 12'. The first fluid-carrying channel 12 includes an upper wall 14, a lower wall 16, and a side wall 18. The second fluid-carrying channel 12' includes an upper wall 14', a lower wall 16', and a side wall 18'.

It is to be understood that the configuration shown is set forth for illustrative purposes only and that other configurations may be possible without deviating from the spirit or scope of the disclosed inventive concept. For example, the width or height of the first fluid-carrying channel 12 and the second fluid-carrying channel 12' could be more or less than illustrated. In addition, while the dimensions of the first fluid-carrying channel 12 and the second fluid-carrying channel 12' are illustrated as being the same, it is to be understood that this is not necessarily the case as one may be larger or smaller than the other depending on engineering requirements.

Figure 2:
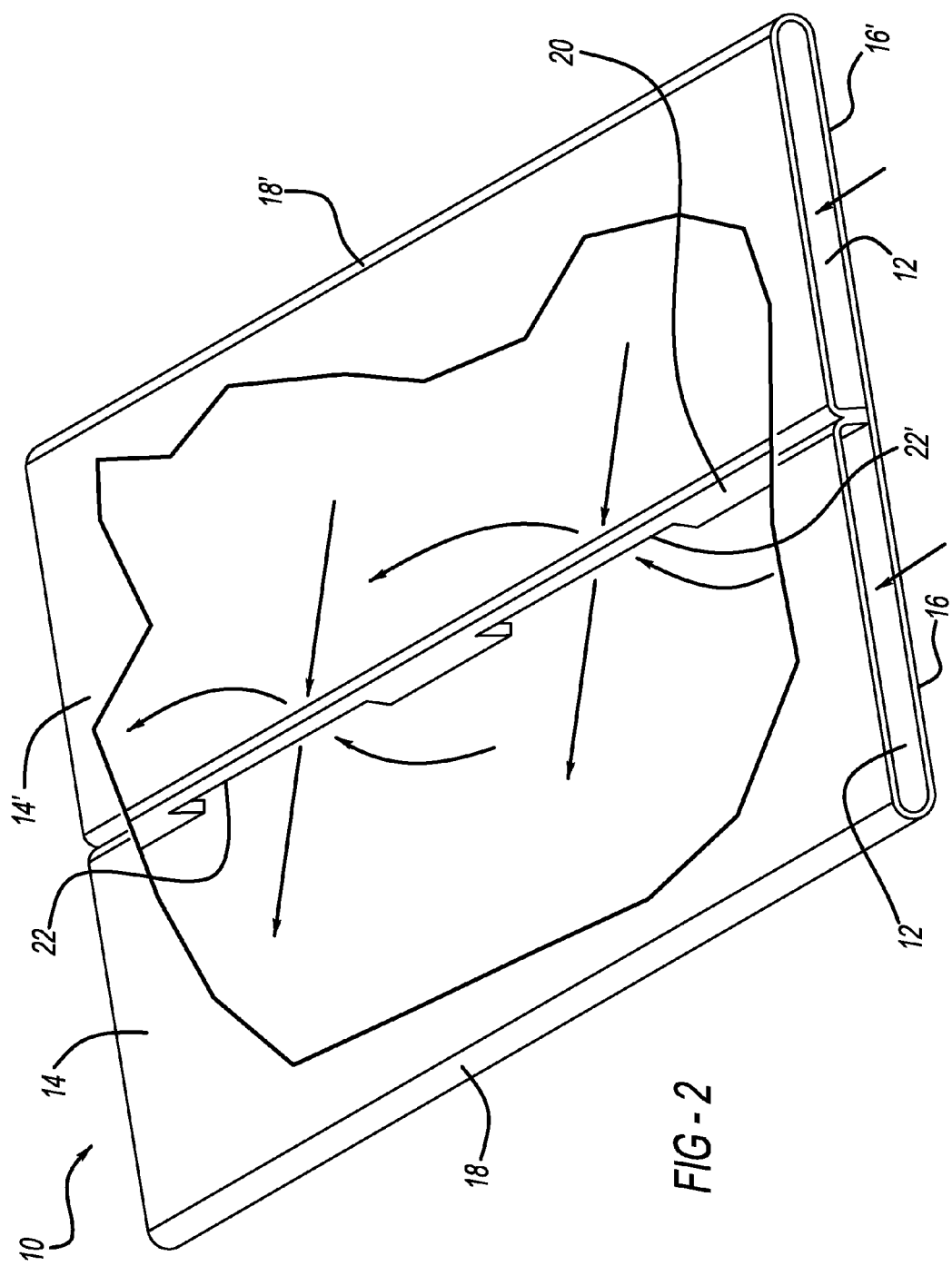
FIG. 2 is a view similar to that of FIG. 1 but shows an outer section of the bi-channel coolant tube removed to reveal the internal divider having coolant exchanging windows formed therein according to the disclosed inventive concept.

A common wall or divider 20 joins the first fluid-carrying channel 12 and the second fluid-carrying channel 12'. As illustrated in FIG. 2 in which a portion of the upper walls 14 and 14' has been removed, according to the disclosed inventive concept the divider 20 has fluid-passing windows 22 and 22' formed therein.

Figure 5:
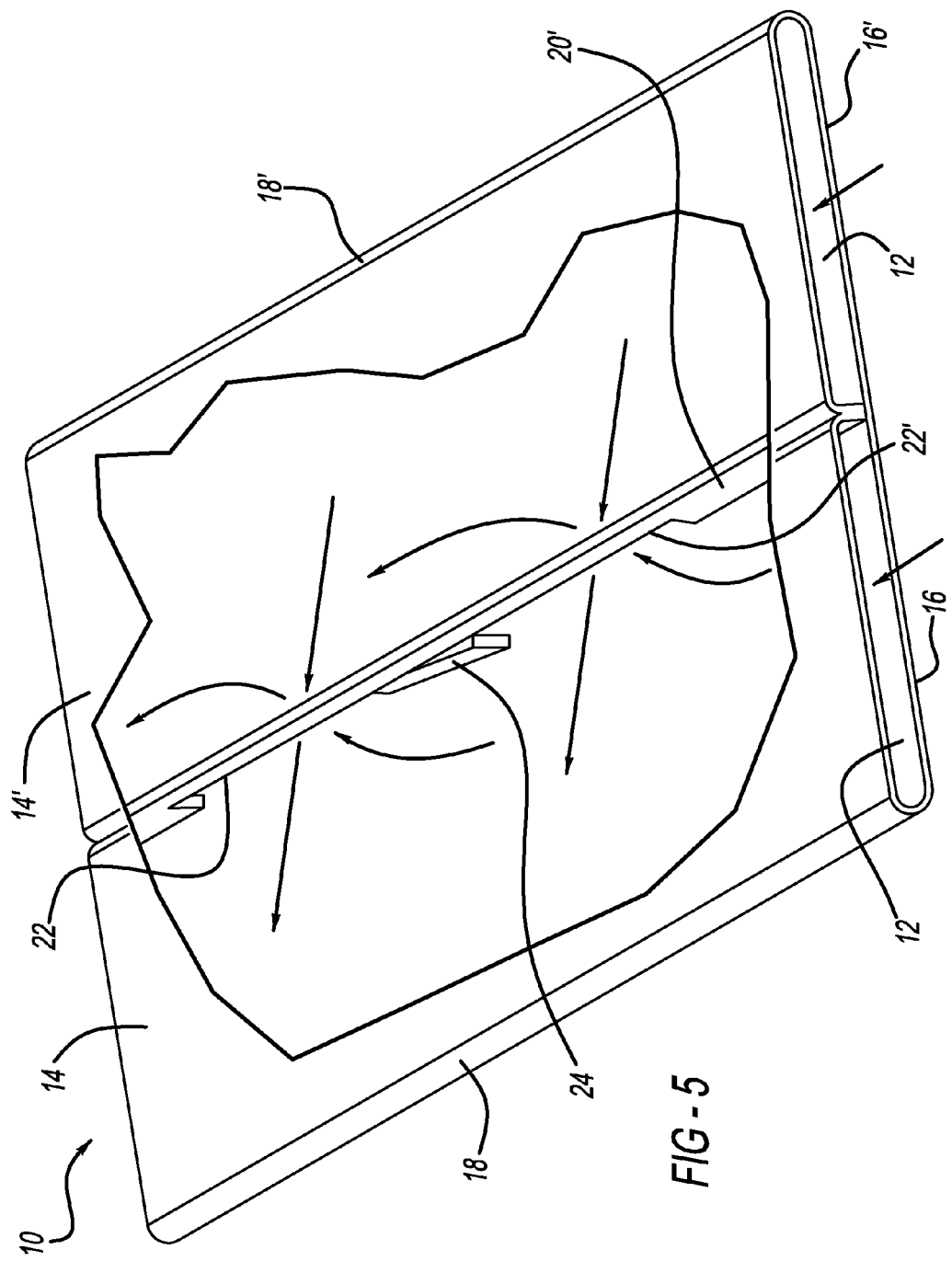
FIG. 5 is a view similar to that of FIG. 2 but shows a portion of the internal divider positioned at an angle.

The number of fluid-passing windows may be varied again to regulate the volume of coolant passing between the first fluid-carrying channel 12 and the second fluid-carrying channel 12'. In addition, the shape and dimensions of the fluid-passing windows 22 and 22' may be configured so as to regulate the volume of coolant passing between the first fluid-carrying channel 12 and the second fluid-carrying channel 12'. For example, and as shown in FIG. 5, the fluid flow through and around the fluid-passing window 22' of a divider 20' can be modified by including a portion 24 that is angled relative to the surface of the remainder of the divider 20'. The degree of angle of the portion 24 relative to the divider 20' may be varied beyond that illustrated in FIG. 5. Furthermore, additional angled portions may be provided to further adjust and regulate coolant flow.

Figure 6:
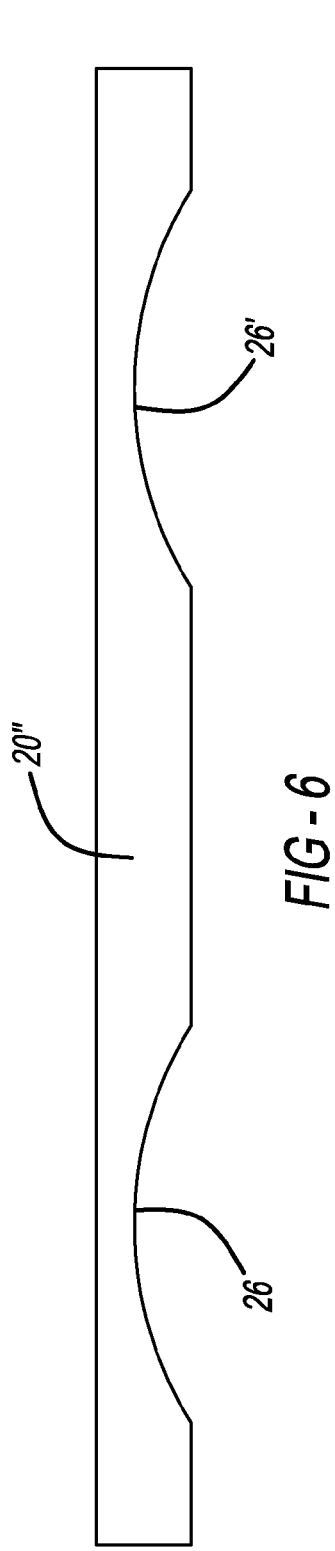
FIG. 6 is an elevational view of an alternative embodiment of the internal divider in which the fluid-passing windows have an ovoid shape.
Figure 7:
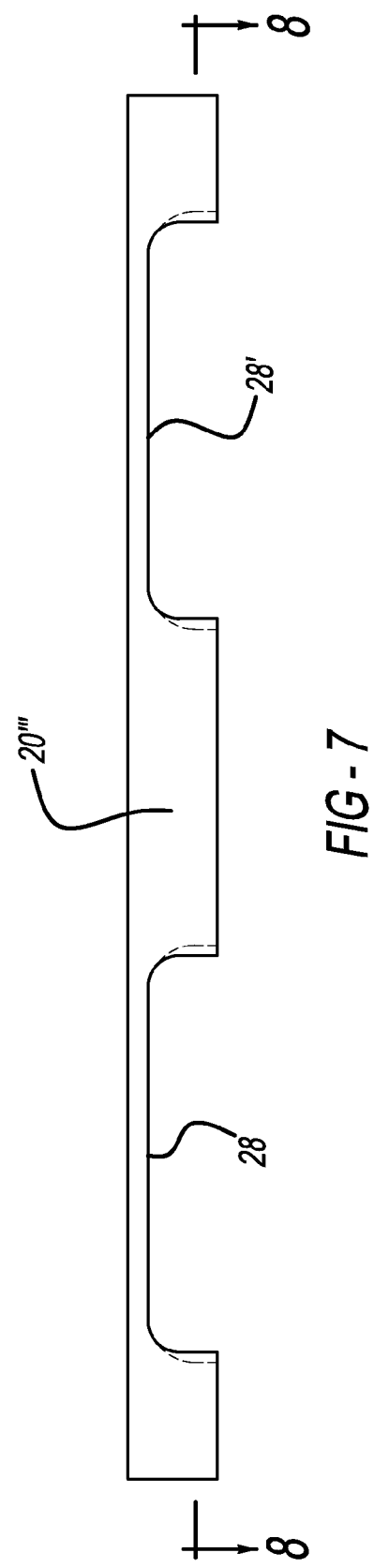
FIG. 7 is an elevational view of an additional alternative embodiment of the internal divider in which the fluid-passing windows have curved corners.
Figure 8:
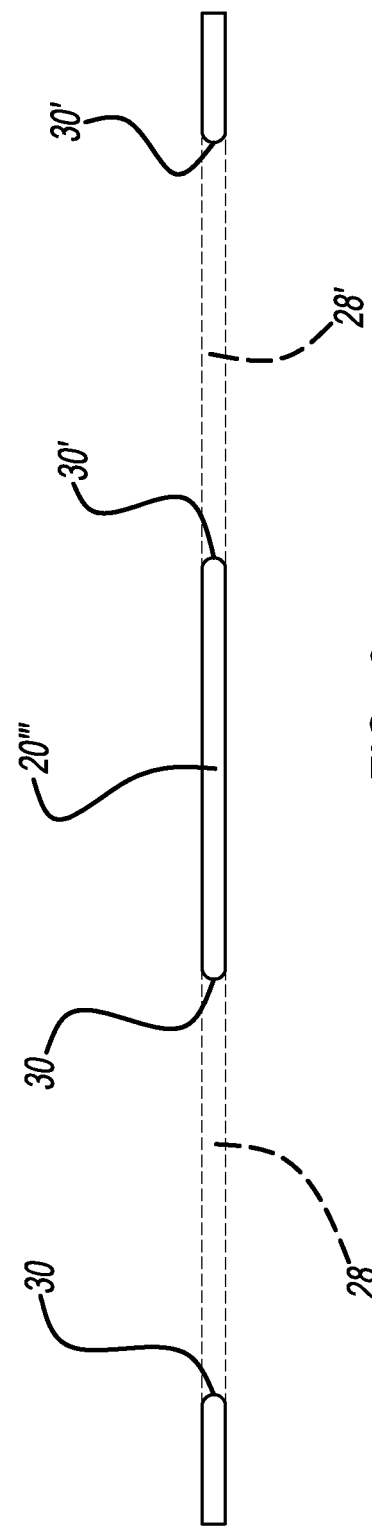
FIG. 8 is a sectional view of the internal divider taken along line 8-8 of FIG. 7.

The coolant flow can be further modified by changing the shape of the fluid-passing windows. Non-limiting examples of alternative fluid-passing windows are illustrated in FIGS. 6 and 7. Referring to FIG. 6, fluid-passing windows 26 and 26' of a divider 20" have ovoid shapes and may be used alone or in combination with fluid-passing windows having other shapes, such as the squared off fluid-passing windows 22 and 22' shown in FIG. 2.

A further variation of the shape of the fluid-passing windows is illustrated in FIG. 7. Referring to FIG. 7, fluid-passing windows 28 and 28' of a divider 20''' have rounded corners are provided. As with the fluid-passing windows 26 and 26', the fluid-passing windows 28 and 28' may be used alone or in combination with fluid-passing windows having other shapes shown in FIGS. 2 and 6.

As a further possible variation to the fluid-passing windows of the disclosed inventive concept the edges of the windows may be modified to reduce fluid turbulence and the resulting stress that might be generated by squared off edges. As a non-limiting example, the fluid-passing window 28 includes a pair of opposed rounded leading edges 30 and the fluid-passing window 28' includes a pair of opposed rounded leading edges 30'. The degree of curvature may be varied to further modify fluid flow and to control turbulence.

The bi-channel coolant tube 10 of the disclosed inventive concept may be formed from a variety of materials suitable for such use. For example, the bi-channel coolant tube 10 may be formed from a metal suitable for such applications. The metal may be selected from the group consisting of aluminum, including aluminum alloy, and steel, including stainless steel.

The bi-channel coolant tube 10 of the disclosed inventive concept overcomes the problems of known systems by providing for the exchange of a limited amount of hot and cold coolant, thus minimizing or eliminating the thermal stress experienced in known heat exchangers. While the preferred embodiments of the disclosed inventive concept are shown in the accompanying drawings and are set forth in the associated description, one skilled in the art will readily recognize from such discussion, and from the accompanying drawings and claims that various changes, modifications and variations can be made therein without departing from the true spirit and fair scope of the invention as defined by the following claims.

What is claimed is:

1. A bi-channel coolant tube comprising:
   a first fluid-carrying channel;
   a second fluid-carrying channel;
   a base wall shared by both said first and said second fluid-carrying channel;
   a divider separating said first and second fluid-carrying channels; and
   a fluid-passing window formed in said divider, said window having an edge, said divider including a surface, a portion of said surface attached to said edge and extending away from said surface at an angle, said portion and said divider being perpendicular to said base wall.

2. The bi-channel coolant tube of claim 1 in which said window is an elongated window.

3. The bi-channel coolant tube of claim 2 wherein said tube has a long axis and said elongated window is elongated along said long axis of said coolant tube.

4. The bi-channel coolant tube of claim 1 including a plurality of fluid-passing windows.

5. The bi-channel coolant tube of claim 1 wherein the coolant tube is substantially flat.

6. The bi-channel coolant tube of claim 1 wherein said fluid-passing window has a shape and where said shape is selected from the group consisting of squared, curved and a combination of squared and curved.

7. A multi-channel fluid conduit in a heat exchanger comprising:
   a first fluid-carrying tube;
   a second fluid-carrying tube;
   a base wall;
   a common wall extending from said base wall and joining said first and second fluid-passing tubes; and
   at least one window formed in said common wall for passing fluid between said tubes, said window having an edge, said common wall including a surface, a portion of said surface attached to said edge and extending away from said surface at an angle, said portion and said common wall being perpendicular to said base wall.

8. The multi-channel fluid conduit of claim 7 in which said window is an elongated window.

9. The multi-channel fluid conduit of claim 8 wherein said conduit has a long axis and said elongated window is elongated along said long axis of said conduit.

10. The multi-channel fluid conduit of claim 7 including a plurality of said windows.

11. The multi-channel fluid conduit of claim 7 wherein said first and second fluid-carrying tubes are substantially flat.

12. The multi-channel fluid conduit of claim 7 wherein said window has a shape and where said shape is selected from the group consisting of squared, curved and a combination of squared and curved.

13. A multi-channel fluid conduit in a heat exchanger comprising:
   a substantially flat first fluid-carrying tube;
   a substantially flat second fluid-carrying tube;
   a base wall a common wall extending from said base wall and joining said first and second fluid-passing tubes, said wall defining a plane; and at least one elongated window formed in said common wall for passing fluid between said tubes, said window having an edge, said window being formed by a fluid flow-regulating door that is continuous with said edge and angled away from said common wall, said door having a connected end that is connected to said common wall and an open end that is space apart from said plane of said common wall, said common wall and said flow-regulating door being perpendicular to said base wall.

14. The multi-channel fluid conduit of claim 13 wherein said conduit has a long axis and said elongated window is elongated along said long axis of said conduit.

15. The multi-channel fluid conduit of claim 13 including a plurality of said windows.

16. The multi-channel fluid conduit of claim 13 wherein said elongated window has a shape and where said shape is selected from the group consisting of squared, curved and a combination of squared and curved.

\* \* \* \* \*